United States Patent
Pafitis et al.

(10) Patent No.: US 6,279,655 B1
(45) Date of Patent: Aug. 28, 2001

(54) THIXOTROPIC MATERIALS

(75) Inventors: Demosthenis Georgeou Pafitis, Houston, TX (US); Stephen Nigel Davies, Over (GB); Geoffrey Colin Maitland, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/527,911

(22) Filed: Mar. 17, 2000

Related U.S. Application Data

(63) Continuation of application No. 08/860,613, filed as application No. PCT/GB95/02930 on Dec. 15, 1995, now abandoned.

(30) Foreign Application Priority Data

Jan. 4, 1995 (GB) .................................... 9500089

(51) Int. Cl.[7] .................................... E21B 33/14
(52) U.S. Cl. .......................... 166/294; 166/300; 106/694; 106/718
(58) Field of Search .................. 166/285, 291, 166/292, 294, 295, 300; 106/694, 718, 719, 819

(56) References Cited

U.S. PATENT DOCUMENTS

| | | | |
|---|---|---|---|
| 3,227,213 | * 1/1966 | Smith | 166/292 |
| 3,804,174 | 4/1974 | Chatterji et al. . | |
| 3,847,635 | 11/1974 | Lange et al. . | |
| 3,866,683 | * 2/1975 | Maly et al. | 166/292 |
| 3,959,003 | 5/1976 | Ostroot et al. . | |
| 4,202,413 | * 5/1980 | Messenger | 166/292 |
| 4,235,291 | * 11/1980 | Messenger | 166/292 |
| 4,415,367 | 11/1983 | Nelson . | |
| 4,524,828 | 6/1985 | Sabins et al. . | |
| 4,822,421 | 4/1989 | Crabb . | |

FOREIGN PATENT DOCUMENTS

| | | |
|---|---|---|
| 005835A1 | 5/1979 | (EP) . |
| 2187727A | 9/1987 | (GB) . |
| WO 87/02093A1 | 4/1987 | (WO) . |
| WO 95/00739A1 | 1/1995 | (WO) . |

* cited by examiner

Primary Examiner—David Bagnell
Assistant Examiner—Zakiya Walker
(74) Attorney, Agent, or Firm—Robin C. Nava; Stephen Schlather; Thomas O. Mitchell

(57) ABSTRACT

A settable thixotropic material comprises a thixotrope and a settable substance, the material being capable of gelling reversibly in a gelling time of less than 60 seconds. The thixotrope conveniently comprises a fine grained clay, especially smectite clays, e.g. hectorites. It is preferred to use synthetic smectite type clay colloids, and goods results have been obtained with the synthetic clay known as Laponite RDS. The settable material conveniently comprises cement, particularly Portland cement. The thixotropic material finds use generally in oilwell applications, e.g. to plug lost circulation zones, to repair damaged or corroded casing, as grouts, and to limit annular gas migration. The material also finds particular application in techniques for completion of horizontal wells completed with slotted or pre-drilled liners.

17 Claims, 2 Drawing Sheets

THIXOTROPIC MATERIALS

Figure 1:
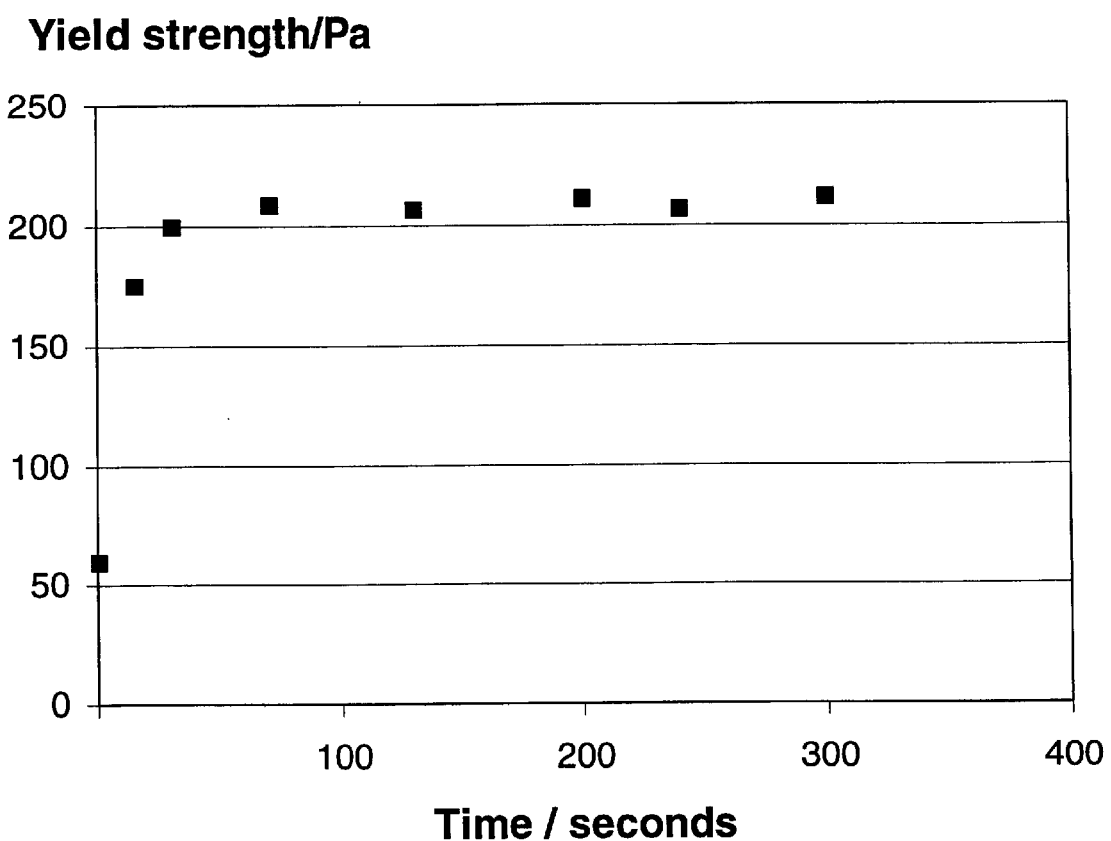

This application is a continuation of Ser. No. 08/860,613, now abandoned, filed Nov. 24, 1997, which is a 371 of PCT/GB95/02930 filed Dec. 15, 1995.

FIELD OF INVENTION

This invention relates to thixotropic materials, particularly thixotropic settable materials such as thixotropic cements.

BACKGROUND TO THE INVENTION

Thixotropic materials have the property of being fluid under shear but developing a gel structure and becoming self-supporting when at rest. The process is reversible. Thixotropic cements, which are thin and fluid during mixing and placement but reversibly form a rigid gel structure when pumping ceases, are useful in various oilwell applications. For example, thixotropic cement systems are used to plug lost circulation zones during both drilling and cementing operations, to repair damaged or corroded casing, as grouts, and to limit annular gas migration in some situations. Such systems have also been used in situations where weak formations are exposed and would otherwise fracture under the hydrostatic pressure of a cement column: with a thixotropic cement the hydrostatic pressure of the column diminishes as the cement gels.

Various thixotropic cement systems are known in the prior art, including the following:
1. Clay-based systems. These typically comprise Portland cement and bentonite clay.
2. Calcium sulphate-based systems. The material most widely used for this purpose is calcium sulphate hemihydrate. See, for example, U.S. Pat. No. 3,847,635.
3. Aluminium sulphate/iron (II) sulphate systems. See, for example, U.S. Pat. No. 4,415,367.
4. Crosslinked cellulose polymer systems. See, for example, U.S. Pat. Nos. 3,959,003, 3,804,174 and 4,524,828.
5. Mixed metal hydroxide systems. See, for example, U.S. Pat. No. 4,822,421.

The known thixotropic cement systems have various limitations, one of which is that a significant time is taken for a gel structure to develop on removal of shear: at best this is of the order of several minutes and can be substantially longer, possibly approaching the timescale over which the cement sets. This can present problems in certain situations.

SUMMARY OF THE INVENTION

According to one aspect of the present invention there is provided a settable thixotropic material, comprising a thixotrope and a settable substance, the material being capable of rapidly and reversibly gelling.

The term "rapid" is used in this context to mean the material gels in a gelling time of less than 60 seconds, preferably less than 30 seconds, more preferably less than 10 seconds.

A gel shear yield stress of at least 100 Pascal (Pa), typically 150 to 300 Pa, and possibly up to 500 Pa or more is desirably developed in the gelling time.

The material preferably reaches substantially its maximum gel strength (i.e. at least about 90% of the maximum value) within the gelling time, and maintains this, value (i.e. staying within about 20% of this value) for an extended period of time (i.e. at least 2 hours) until setting has started.

The material desirably has a low viscosity so as to be readily pumpable, conveniently having a viscosity of less than 30 Bearden units as measured in a standard oilfield consistometer.

Preferably the material is mixable in standard oilfield cement mixing equipment.

The time taken for the material to set (the setting time) is substantially longer than the gelling time, typically at least 2 hours and possibly up to 8 hours or more. Thus, if material flow stops, even for an extended time, it will still be possible to resume pumping. The gel is preferably reversible until setting has occurred.

The gelling time and the setting time of the material are preferably separately controllable so that it is possible to produce a material having desired combinations of gelling and setting times, e.g. a fast gelling/slow setting material, a fast gelling/fast setting material etc. The setting time is typically controlled by use of retarders in a manner well known to those skilled in the art.

The properties of the material when set, including strength, porosity, interfacial bonding to rock and steel/plastics, can be tailored to suit the intended use of the material.

The material preferably has the characteristics and performance specified above under down-hole conditions. These typically include temperatures in the range 50 to 150° C. and possibly higher, and pressures of up to 1000 bar and possibly higher. The material should also be able to cope with environmental factors such as the variable and sometimes high salinity and hardness of wellbore fluids, and the presence of hydrocarbons and particulate matter.

The thixotrope may be selected from a number of known thixotropic substances, particularly strongly interacting particulate and molecular species. In the first case, the thixotrope conveniently comprises a fine grained (having a mean particle size with maximum dimension of less than 1 micron) inorganic colloid, particularly fine grained clays, especially smectite clays, e.g. hectorites. It is preferred to use synthetic smectite type clay colloids, and good results have been obtained with the synthetic clay known as Laponite RDS from Laporte (Laponite is a Trade Mark of Laporte Industries Limited). Laponite is a synthetic trioctahedral smectite similar to the natural clay hectorite. Laponite RDS is a layered hydrous sodium lithium magnesium silicate modified with tetra sodium pyrophosphate. It is in the form of a free-flowing powder which is easily dispersed in water. At concentrations below approximately 10% by weight in water, it forms a stable sol. The individual clay platelets in the sol are about 250 Å in diameter and about 10 Å thick with a negative face charge and a positive edge charge.

Other strongly interacting colloids such as latexes and other materials, e.g. as used in the paint industry and the pharmaceutical industry, may also be useful for this purpose. Similarly, mixed metal hydroxides may be useful. Associative polymers and self-assembling surfactant systems may also act as suitable thixotropes.

Appropriate mixtures of thixotropes may be used.

The settable material may be selected from a range of known settable materials, including the following:
1. Cementitious materials, e.g. cements, particularly Portland cements, blast furnace slag, fly ash/lime mixes and mixtures of these materials.
2. Other ceramic-forming materials.
3. Polymeric materials, e.g. thermosetting polymers etc.

Appropriate mixtures of settable materials may be used.

The thixotropes and settable materials should be selected to be compatible with each other, in known manner.

The material may include other compatible ingredients, such as additives conventionally used in oilfield-cements. Where the settable material is a cement, a cement retarder will generally be included. Suitable retarders are known to those skilled in the art and include, for example, the sodium or calcium salts of lignosulphonic acids. Further, a surfactant may be included to act as a dispersant and/or cement retarder. Anti-foaming agents may also be included. Depending on the intended use of the material, other materials may be included as fillers. Other conventional additives may also be included provided they do not interfere with the gel forming properties of the material.

Good results have been obtained with mixtures of Laponite RDS and Portland cement, particularly of classes A and G. These cements are predominantly calcium oxide and silicon dioxide with minor amounts of iron oxide, aluminium oxide, sulphur trioxide and other trace level compounds. The chemical compounds included in the set anhydrous cements include tricalcium aluminate, dicalcium silicate and tetracalcium alumino ferrite. Typical compositions comprise 3 to 6% Laponite RDS by weight of water, with a water/cement ratio of about 50%.

In order to produce thixotropic slurries, it is necessary to prehydrate the Laponite RDS with water, thus forming a sol. Once cement powder or other fine solid is added to this fluid, or when the electrolyte concentration is increased to within an appropriate range, a thixotropic gel is rapidly formed. The fluid may be easily pumped but when shearing ceases the cement rapidly gels (within a matter of a few seconds) and becomes immobile. After longer periods of time (hours), the cement hydrates to form a strong elastic solid with low permeability to fluids. The setting time of the cement can be controlled in conventional manner by use of traditional cement retarder agents such as sodium or calcium salts of lignosulphonic acids. An important feature of this thixotropic cement system is that the rapid gelation is imparted via a colloidal mechanism, which is in general separate from the hydration chemistry of the reacting cement minerals. Hence the thixotropic and setting characteristics are decoupled and may be controlled separately.

The thixotropic material of the invention finds use generally in oilwell applications, including those mentioned above. The material also finds particular application in techniques for completion of horizontal wells completed with slotted or predrilled liners, as described in International Application WO-95/00739.

Thus, in a further aspect the invention provides a method of placing a plug in a region around a perforate liner in a wellbore, particularly a generally horizontal wellbore, the method comprising:

placing a pair of packers inside the liner where the plug is to be positioned, the packers being spaced apart so as to define both a chamber inside the liner which includes a perforation and also a region to be plugged outside the liner; and pumping a predetermined volume of settable thixotropic material in accordance with the invention into the chamber and, via the perforation, into the region to be plugged, which predetermined volume of material is sufficient to displace substantially all other fluids from the region to be plugged.

The invention also provides a method of forming a plug in a region in a well, in which method a volume of settable thixotropic material in accordance with the invention is pumped into the region, conveniently via suitable packer apparatus such as a pair of region-delimiting packers, which volume is sufficient to displace substantially all other fluids from the region to be plugged.

In a further aspect the invention also provides a method of cementing a casing or pipe in a borehole, comprising introducing into the annular space between the outer surface of the casing or pipe and the wall of the borehole a settable thixotropic material in accordance with the invention; and allowing the material to set.

Figure 2:
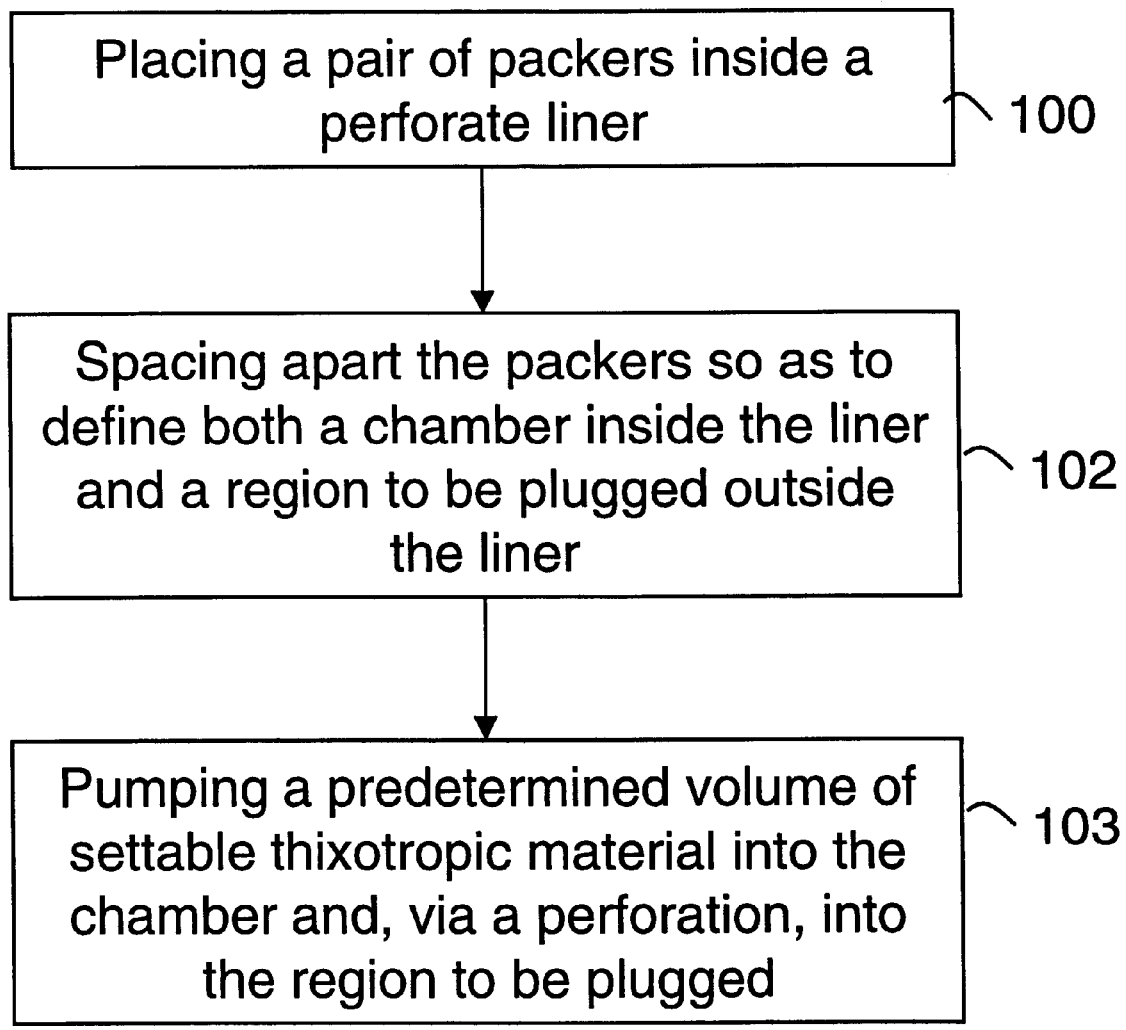

The invention will be further described, by way of illustration, in the following Examples and with reference to the accompanying drawing, wherein FIG. 1 is a graph of shear yield stress in Pa versus time in seconds showing yield strength evolution of a thixotropic cement formulation in accordance with the present invention; and FIG. 2 is a flow chart showing a method of placing a plug in a region around a perforate liner in a wellbore according to a preferred embodiment of the invention.

EXAMPLES

A thixotropic cement in accordance with the invention was made from 10.2 g Laponite RDS, 3.5 g Dowell D013, 340 g water and 700 g Portland cement (class G). Dowell D013 is a proprietary cement hydration retarder comprising sodium or calcium salt of lignosulphonic acid, obtainable from Dowell.

The Laponite RDS is mixed with tap water at ambient temperature and pressure at high shear, preferably for at least one hour in order to hydrate the clay fully and produce a well dispersed sol. The Dowell D013 is added to the resulting sol which is sheared sufficiently to produce a homogeneous mixture. As well as acting as a cement hydration retarder, the Dowell D013 prevents the formation of free water when the slurry is static. To prevent significant air entrainment during the mixing of this fluid, a polyether polyol anti-foaming agent such as that found in Dowell D047 (obtainable from Dowell) may optionally be added at a concentration of 1% by weight of the mix water. Using a Waring type blender at a speed of 4000 rpm, the cement powder is slowly added to the mixture, typically over a period of 10 minutes.

This procedure results in production of a slurry that does not develop free water, exhibits thixotropic properties up to temperatures of at least 85° C. and is easily pumpable. Soon after mixing, this slurry when allowed to remain static exhibits a rapid evolution in yield strength, as shown in the accompanying figure. The graph shows rapid gelation from an initial shear yield stress after 2 seconds static of about 60 Pa, rising rapidly to a plateau level of about 210 Pa. The gel strength remains substantially at this level over an extended time period, and the gel remains rapidly and reversibly thixotropic during this time. The cement has a setting time in excess of 8 hours at room temperature.

A similar slurry has been mixed on a large scale using standard industry mixing equipment, namely a Dowell RMX recirculating mixer.

By varying the amount of Dowell D013 used, e.g. from 0.15 to 0.5% by weight of cement powder, the setting time of the cement at any given temperature can be varied as desired. For example, at 85° C. a slurry with a water to cement ratio of 0.47 containing 0.2% D013 by weight of cement and 1.53% Laponite RDS, exhibits a setting time of 160 minutes. The gelling and setting properties of the material can thus be separately controlled.

In order to transform Laponite RDS sol into a gel, it is found that a critical concentration of cations must be present. For instance, when using calcium ions added to a 3% concentration of Laponite RDS, a gel can be formed when the calcium ion concentration is greater than 20 mmol/l. When cement is added to a solution of Laponite RDS, calcium ions are drawn into solution from various of the cement mineral phases, and this is sufficient to activate gellation. However, it is important to avoid too high a level of calcium ions, as excess divalent ions cause flocculation of the clay and loss of thixotropy. By substituting silica flour for some of the cement, the peak calcium ion loading of the slurry aqueous phase on mixing can be reduced to within an acceptable range, if necessary. The same effect can be achieved by increasing the water/solid ratio of the slurry.

By varying the formulation appropriately a material can be produced with properties to suit particular intended applications. Further typical formulations are as follows:

40° C.

Water/solids ratio 0.55 to 0.57

Class G Portland cement 40 to 42% silica flour by weight of cement

Laponite RDS 3.0 to 4.0% by weight of water

Cement retarders (Dowell D013) to adjust setting time

88° C.

Solids volume fraction—50%

Class G Portland cement

49% silica flour by weight of cement 3.2% Laponite RDS by weight of water

Cement retarders (Dowell D801/D093) to adjust setting time.

FIG. 2 is a flow chart showing a method of placing a plug in a region around a perforate liner in a wellbore, particularly a generally horizontal wellbore according to a preferred embodiment of the invention. Step 100 involves placing a pair of packers inside the liner where the plug is to be positioned. Step 102 involves spacing apart the packers so as to define both a chamber inside the liner which includes a perforation and also a region to be plugged outside the liner. Step 103 involves pumping a predetermined volume of settable thixotropic compound into the chamber and, via the perforation, into the region to be plugged, which the predetermined volume of compound is sufficient to displace substantially all other fluids from the region to be plugged.

What is claimed is:

1. A method of placing a plug in a region around a perforate liner in a wellbore, particularly a generally horizontal wellbore, the method comprising the steps of:

placing a pair of packers inside the liner where the plug is to be positioned, the packers being spaced apart so as to define both a chamber inside the liner which includes a perforation and also a region to be plugged outside the liner; and pumping a predetermined volume of settable thixotropic compound, said compound including a prehydrated thixotrope and a settable material and being capable of gelling reversibly via a colloidal mechanism and being capable of substantially reaching its maximum gel strength in a gelling time of less than 60 seconds, said thixotrope comprising a fine grained clay, wherein a setting time is substantially longer than the gelling time into the chamber and, via the perforation, into the region to be plugged, which said predetermined volume of compound is sufficient to displace substantially all other fluids from the region to be plugged.

2. A method of forming a plug in a region in a well comprising the step of pumping a volume of settable thixotropic compound, said compound including a prehydrated thixotrope and a settable material and being capable of gelling reversibly via a colloidal mechanism and being capable of substantially reaching its maximum gel strength in a gelling time of less than 60 seconds, said thixotrope comprising a fine grained clay wherein a setting time is substantially longer than the gelling time, into the region, preferably via suitable packer apparatus, said volume being sufficient to displace substantially all other fluids from the region to be plugged.

3. A method according to claim 2, wherein the suitable packer apparatus is a pair of region-delimiting packers.

4. A method of cementing a casing or pipe in a borehole, comprising the steps of:

introducing into an annular space between an outer surface of the casing or pipe and a wall of the borehole a settable thixotropic compound, said compound including a prehydrated thixotrope and a settable material and being capable of gelling reversibly via a colloidal mechanism and being capable of substantially reaching its maximum gel strength in a gelling time of less than 60 seconds, said thixotrope comprising a fine grained clay wherein a setting time is substantially longer than the gelling time; and allowing the compound to set.

5. A settable thixotropic compound including a prehydrated thixotrope and a settable material and being capable of gelling reversibly via a colloidal mechanism and being capable of substantially reaching its maximum gel strength in a gelling time of less than 60 seconds, said thixotrope comprising a fine grained clay, wherein a setting time is substantially longer than the gelling time.

6. A compound according to claim 5, wherein the thixotrope comprises smectite type clay colloids.

7. A compound according to claim 5, wherein the thixotrope comprises hectorites.

8. A compound according to claim 5, wherein the settable material is selected from the group consisting of cementitious materials; ceramic-forming materials; or polymeric materials.

9. A compound according to claim 5, wherein the settable material comprises cement, and the compound additionally comprises a cement retarder.

10. A compound according to claim 5, wherein the setting time is at least two hours.

11. A compound according to claim 5, capable of developing a gel shear yield stress of at least 100 Pa in the gelling time.

12. A compound according to claim 5, capable of developing a gel shear yield stress of 150 to 300 Pa in the gelling time.

13. A compound according to claim 5, having a viscosity of less than 30 Bearden.

14. A compound according to claim 5, being capable of substantially reaching its maximum gel strength in a gelling time of less than 30 seconds.

15. A compound according to claim 14, being capable of substantially reaching its maximum gel stregth in a gelling time of less than 10 seconds.

16. A compound according to claim 5, wherein the gelling time and the setting time are separately controllable.

17. A compound according to claim 5, comprising water and cement and comprising 3 to 6% thixotrope by weight of water, with a water/cement ratio of about 50%.

* * * * *